United States Patent
Loewke et al.

(10) Patent No.: US 10,806,126 B1
(45) Date of Patent: Oct. 20, 2020

(54) METHODS AND SYSTEMS FOR DETECTING BARKS

(71) Applicants: Kevin Loewke, Portsmouth, NH (US); Terry Anderton, Hampton Falls, NH (US); Samuel Stoddard, Somersworth, NH (US)

(72) Inventors: Kevin Loewke, Portsmouth, NH (US); Terry Anderton, Hampton Falls, NH (US); Samuel Stoddard, Somersworth, NH (US)

(73) Assignee: WAGZ, Inc., Portsmouth, NH (US)

( * ) Notice: Subject to any disclaimer, the term of this patent is extended or adjusted under 35 U.S.C. 154(b) by 0 days.

(21) Appl. No.: 16/888,979

(22) Filed: Jun. 1, 2020

Related U.S. Application Data

(60) Provisional application No. 62/854,360, filed on May 30, 2019.

(51) Int. Cl.
*A01K 15/02* (2006.01)
*H04R 19/04* (2006.01)
*A01K 27/00* (2006.01)

(52) U.S. Cl.
CPC .......... *A01K 15/022* (2013.01); *A01K 27/009* (2013.01); *H04R 19/04* (2013.01); *H04R 2201/003* (2013.01)

(58) Field of Classification Search
CPC .......................... A01K 15/022; A01K 27/009
See application file for complete search history.

(56) References Cited

U.S. PATENT DOCUMENTS

| | | | |
|---|---|---|---|
| 2006/0011144 A1* | 1/2006 | Kates | G01S 13/86 119/719 |
| 2006/0011145 A1* | 1/2006 | Kates | A01K 15/02 119/719 |
| 2007/0095303 A1* | 5/2007 | Lee, IV | A01K 15/022 119/718 |
| 2008/0018481 A1* | 1/2008 | Zehavi | A01K 15/012 340/573.1 |
| 2010/0050954 A1* | 3/2010 | Lee, IV | A01K 15/022 119/718 |
| 2017/0208775 A1* | 7/2017 | Van Curen | A01K 15/021 |
| 2018/0153138 A1* | 6/2018 | Goetzl | A01K 15/029 |
| 2019/0357497 A1* | 11/2019 | Honchariw | A01K 15/021 |
| 2020/0236901 A1* | 7/2020 | Trottier | A01K 5/0283 |

* cited by examiner

*Primary Examiner* — Christopher D Hutchens
(74) *Attorney, Agent, or Firm* — Ascentage Patent Law, LLC; Travis Lee Johnson; Craig Alan Hallacher

(57) ABSTRACT

A dog bark detection and deterrent method and system including a collar configured to be affixed to a pet, the collar having an audio transmitter configured to provide an audio stimulus; and a power source provided within collar operable to provide power to the audio transmitter, and an audio sensor. The collar is configured to determine when a dog is barking and provide stimulus to deter the dog from continuing to bark.

23 Claims, 9 Drawing Sheets

METHODS AND SYSTEMS FOR DETECTING BARKS

This application claims priority from U.S. Provisional Appl. No. 62/854,360, filed on May 30, 2019, the contents of which are incorporated herein in their entirety.

FIELD OF THE INVENTION

The present invention relates generally to the detection of barks from animals such as dogs. In particular, implementing a bark detection system and method using a collar to be worn by the animal or dog.

BACKGROUND OF THE INVENTION

Pet collars have long been used to provide identification information regarding the home or owner location of pets, particularly when lost. Collars are also often used as an attachment means for leashes or other retention mechanisms for walking etc. Recently smart collars have been used to detect location of animals using GPS location. Some smart collars include stimulus mechanisms to help train the animal or warn of danger. Barking collars have been developed in attempt to train dogs when and when not to bark. Often these collars emit a shock or sound in response to an audible bark. However, these current systems are not as reliable or accurate, and certain situations compound the matter when there are a plurality of noises, some of which may be similar to a dog bark, or from another dog barking or in the environment. Improvements in these areas is desired and the present invention seeks to improve upon these in a novel manner.

SUMMARY OF THE INVENTION

Accordingly, it is desirable to have a system and method for detecting a dog bark and for deterring a dog from barking. The system includes a dog collar with built-in electronics that are utilized to detect that a dog is barking and in one embodiment has at least a bark deterrent device. Accordingly, the present application relates to systems and methods for detecting a dog bark.

A method of detecting a dog barking that includes taking a first digital audio sample for a first period of time. The first digital audio sample is compared to a previous digital audio sample to determine if a difference between the two is below a predetermined initial threshold level. When the difference is below the predetermined threshold level, a second digital is taken for a second period of time that is longer than the first period of time. A scaled second derivative is calculated for the second digital audio sample. The scaled second derivative is compared to at least one primary threshold value to determine if a bark has occurred.

In at least one embodiment, the scaled second derivative is calculated by dividing a maximum second derivative of the second digital audio sample by the peak-to-peak amplitude of the second signal.

In at least one embodiment, wherein the peak-to-peak amplitude is calculated by partitioning the second digital audio sample into three segments, calculating the peak-to-peak amplitude of each segment, and setting the minimum value as the peak-to-peak value. The three segments may be equal in length.

In at least one embodiment, the method includes returning or setting the low power mode for a period of time when the difference between either the first or second audio sample is equal to or below either the predetermined initial threshold or primary threshold.

In at least one embodiment, the at least one primary threshold is determined by calculating a scaled second derivative on one or more waveforms of known barks stored in a database.

In at least one embodiment, the at least one primary threshold is determined by a calculating an average of the calculated second derivatives of the stored waveforms of known barks. Each stored waveform of known barks may include a breed or type indicator.

In at least one embodiment, a digital audio sample is taken periodically when the predetermined initial threshold has not been met. An audio sample may be taken every 10 ms.

In some embodiments, an action is performed to deter barking when it is determined that a bark has occurred.

In at least one embodiment, after determining that a bark has occurred, wait a predetermined period of time and redetermine if a second bark has occurred after the predetermined period of time has expired.

In at least one embodiment, a method of detecting a dog barking includes providing a dog collar having an audio sensor, a first processor, and a second processor. The audio sensor is operated for a first period of time to detect a first audio signal. The second processor is used to determine that the audio signal is at least partially consistent with a sound of a dog barking. The audio sensor is operated for a second period of time to detect a second audio signal. The first processor performs an algorithm on a waveform of the second audio signal. It is determined if the waveform is indicative of a dog bark. An action is performed to deter barking when it is determined that a bark has occurred.

In at least one embodiment, the second processor is a low power processor that uses less electrical energy than the first processor.

In at least one embodiment, a low power mode is set when a bark has not occurred, and setting the low power mode includes turning off power to all or part of the first processor.

In at least one embodiment, the method includes waiting a predetermined period of time and reperforming detecting an audio signal, performing an algorithm on the waveform, and determining if the waveform is indicative of a dog bark, when it is determined that a bark has occurred.

In some embodiments a system for detecting a dog barking includes a collar configured to be affixed to a pet. The collar includes a primary processor, a power supply, an audio sensor configured to detect audio signals, and a secondary processor. The secondary processor is a low power processor that uses less electrical power than the primary processor and is configured to determine if an initial detected audio signal may indicate that a dog is barking. The secondary processor is configured to activate the primary processor, based upon the initial detected audio signal, to determine if a second detected signal has a waveform that is consistent with a waveform from a sound of a dog barking.

In at least one embodiment, the secondary processor is integrated with the audio sensor.

In some embodiments, a system for detecting a dog barking includes a collar configured to be affixed to a pet. The collar includes a primary processor, a power supply, and an audio sensor having built-in logic. The audio sensor is configured to detect initial samples of audio signals and the built-in logic is configured to determine whether an initial sample meets an initial threshold. When the initial threshold is met, the primary processor is activated, and either the built-in logic or primary processor requests a secondary sample that is longer than the initial sample to determine whether the secondary sample is indicative of a dog barking sound.

In at least one embodiment, a stimulus device is configured to receive a signal from the primary processor, and the stimulus device is activated if the secondary sample is indicative of a dog barking sound. The stimulus device may include any of the following: an electro-shocking device, a vibrating device, an audio emitting device, and a two-way communication system that includes sending and receiving audio between a user's smartphone to the collar. In at least one embodiment, the primary processor is de-activated if the secondary sample is not indicative of a dog barking sound.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

This application describes an audio-based bark detection system and implementation method. Part of the bark detection system is training the system to discern what is and is not a bark, and a bark from the appropriate animal. One of the ways to do that is to provide a database of various audio samples that are both barks and non-barks collected from various sources and environments, which often include additional sounds or reflection qualities. Ideally, the database includes audio samples that are captured at a fast sampling rate of 30 kHZ or greater for very brief periods of length where n=128. Where n is the number of measurements.

An advantage of using short-length samples is that the system can be trained to have a quick response, because the analysis and focus is around short fast samples.

Figure 1A:
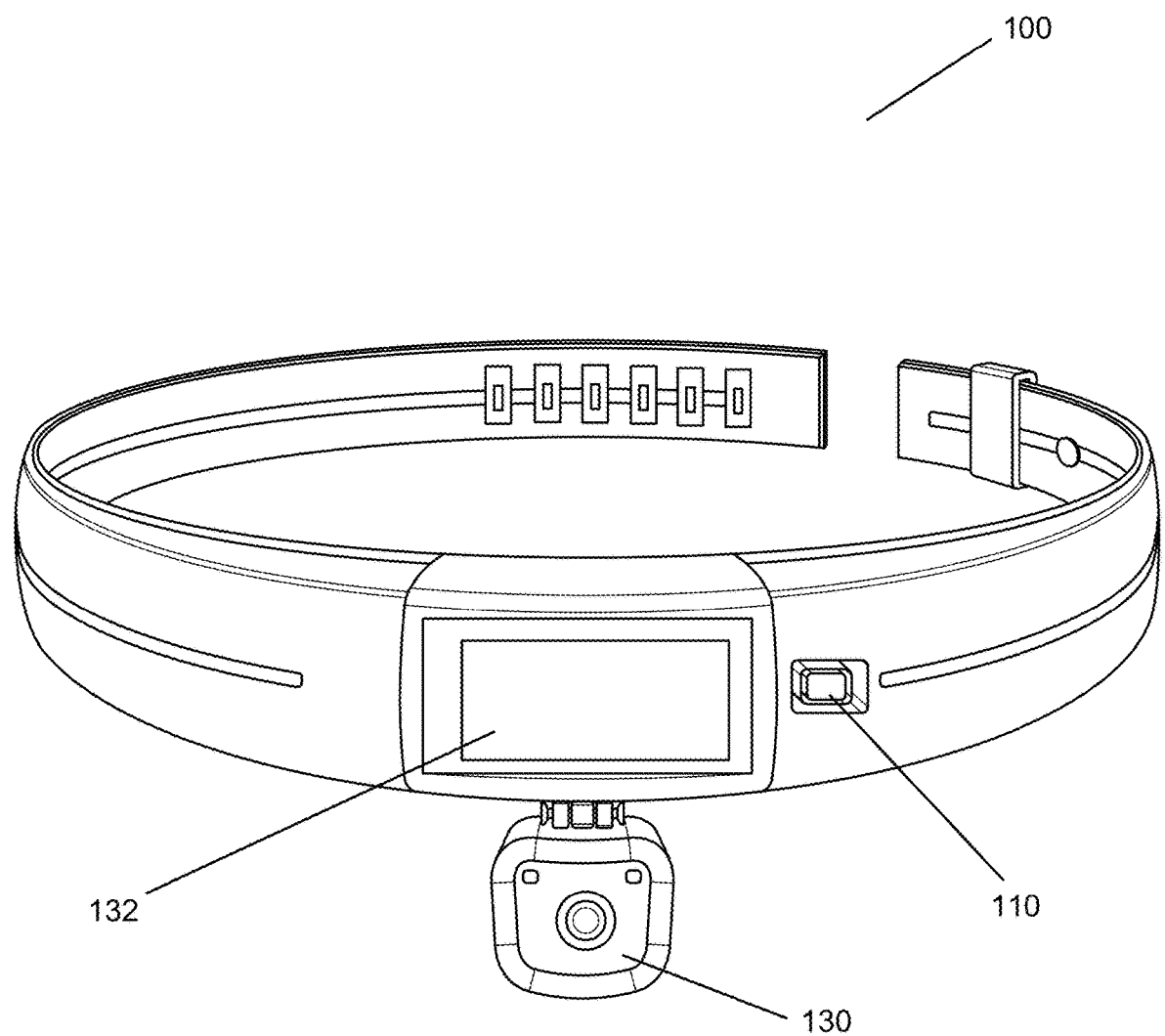
FIG. 1A illustrates a front perspective view of an exemplary pet collar for use in a location-based pet training system and dog bark detection system.
Figure 1B:
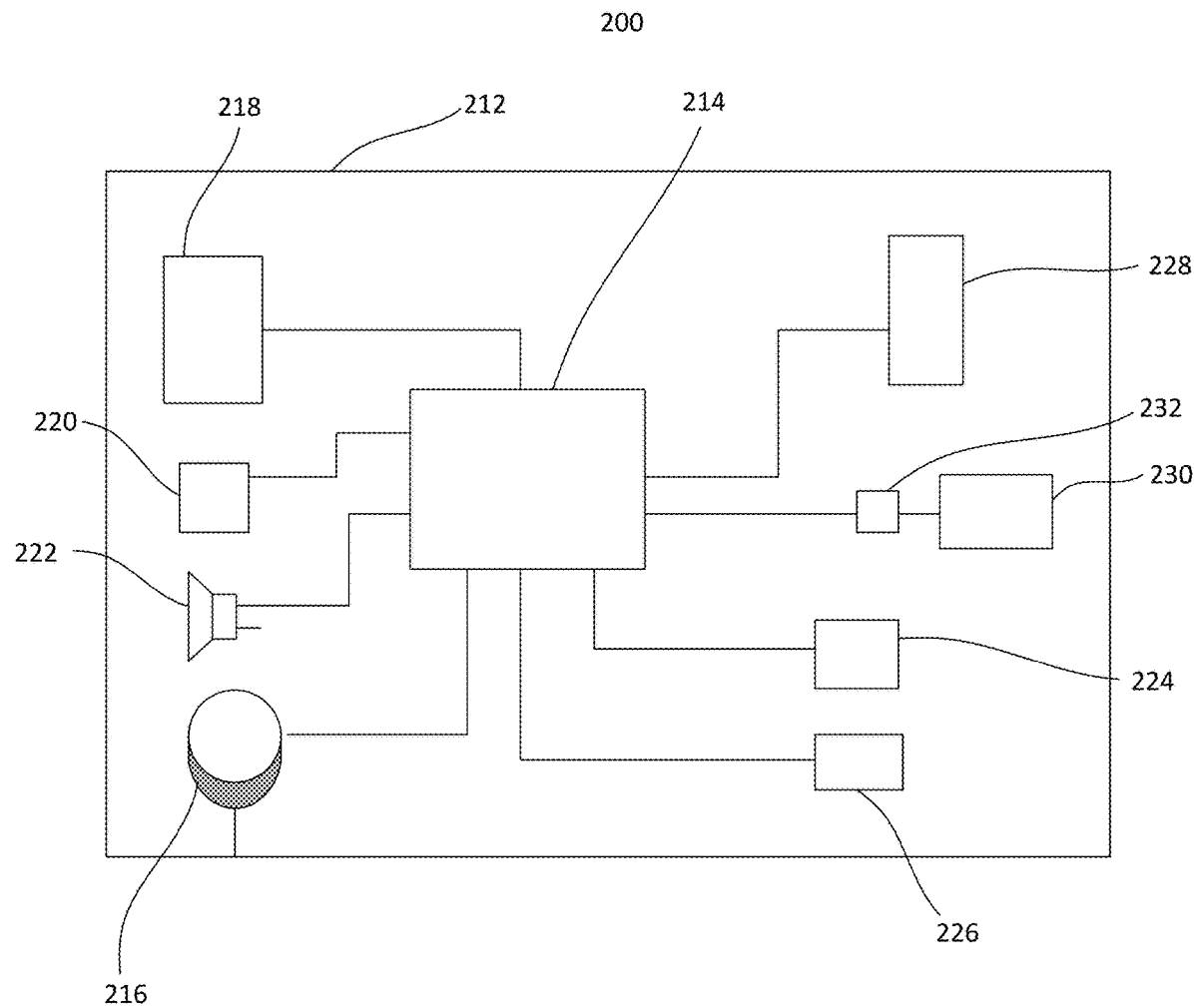
FIG. 1B illustrates an exemplary schematic of electronics provided in a pet collar for use in a location-based pet training system and dog bark detection system.

FIGS. 1A-B illustrate an exemplary dog collar 100 and exemplary schematics 200 for electronic devices provided with the dog collar 100. The electronics 212 include a processor 214, connected to a power supply 216, one or more sensors 218, a haptic feedback device 220, one or more audio emitters 222, memory 224, one or more light emitting devices 226, one or more antennae 228, and an audio sensor 230. The power supply 216 is a battery and optionally a rechargeable battery that is recharged by providing a power cord to input 230. The one or more sensors 218 may include a variety of sensors such as 3-axis magnetometer and an accelerometer. The one or more audio emitters 222 operate to emit ultrasonic sound or an audible-tone, such as a buzzer. The memory 224 may include various types of memory such as flash memory or random-access memory (RAM). The one or more light emitting devices 226 may include light emitting diodes (LEDs) that emit light in various colors such as white, red, green, or blue. The one or more antennae 228 may include various antennae such a global navigation satellite system (GNSS) antenna, a cellular communication antenna such as 3G, 4G, or 5G, or a printed circuit board antenna. The audio sensor 230 is a suitable device for recording audio waves such as a micro-electromechanical systems (MEMS) microphone or an electret condenser microphones (ECM). A secondary processor 232 is electronically connected to the audio sensor 230. The secondary processor 232 is a very low power processor that is designed to run a coarse algorithm to determine if audio signals detected may be a dog bark and then turn the primary processor 214 on. Operation of the system will be described in more detail below. In some embodiments, logic is directly built into the audio sensor, which can receive simple instructions to determine an initial threshold based on initial audio samples from the audio sensor.

Additionally, the collar system can include various sensors and interfaces including but not limited to a tangible display 132 providing pet identification information optical sensors, i.e. a cameras 130, a Global Positioning System (GPS) 110, RFID, infrared communication mechanisms, accelerometers, wi-fi adapters, Bluetooth adapters, SIM or GSM communication modules, temperature sensors, microphones, light sensors, ultrasonic, radio or virtually any other contemplated sensor which would be recognized by those having skill in the art as useful so as to provide a desired feedback regarding a pet activity, it will be appreciated that these various sensors are indicated by the single reference number, but can be provided as virtually any sensor which would provide information regarding a particular activity, parameter, or characteristic. Additionally, display 132 of the collar can be an interactive display which can be used to access information or settings of the collar by a user. In some embodiments, the collar can also include lights as noted above or other indicia which can aid in pet location when lost, particularly at night or other dark conditions. Such a light can also be illuminated automatically in low-light conditions so as to aid in visibility, such as on walks for passing motorists, etc.

Figure 3A:
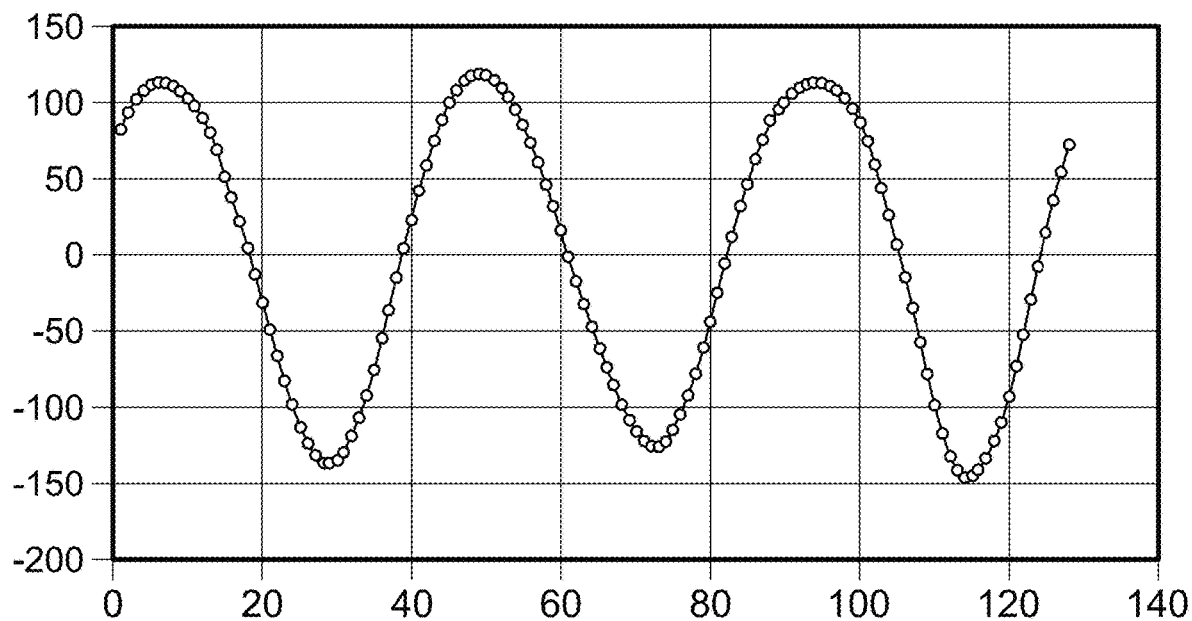
FIGS. 3A-B illustrate examples of audio waves associated with a bark.
Figure 3B:
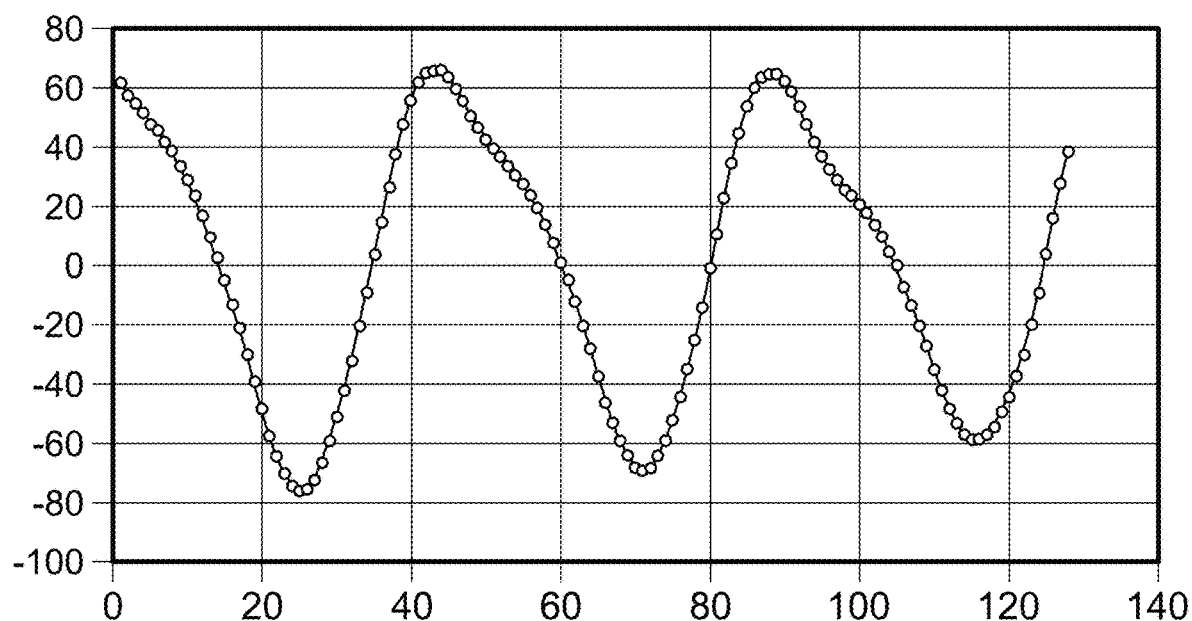
Figure 4A:
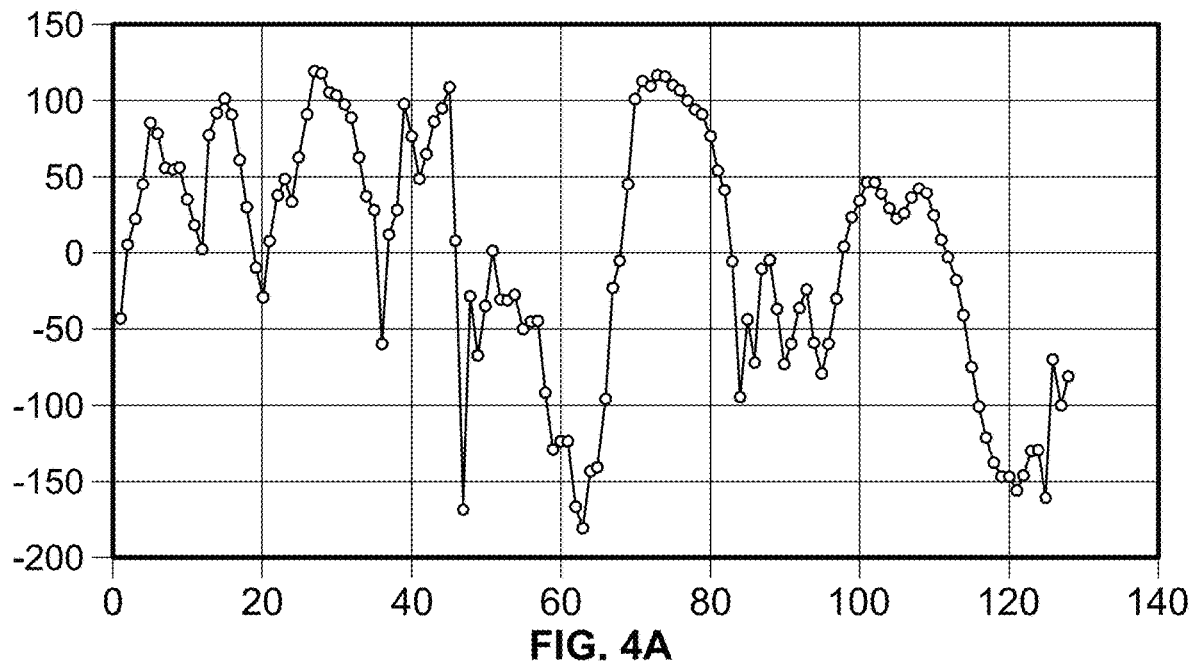
FIGS. 4A-B illustrates examples of audio waves associated with non-bark sounds.
Figure 4B:
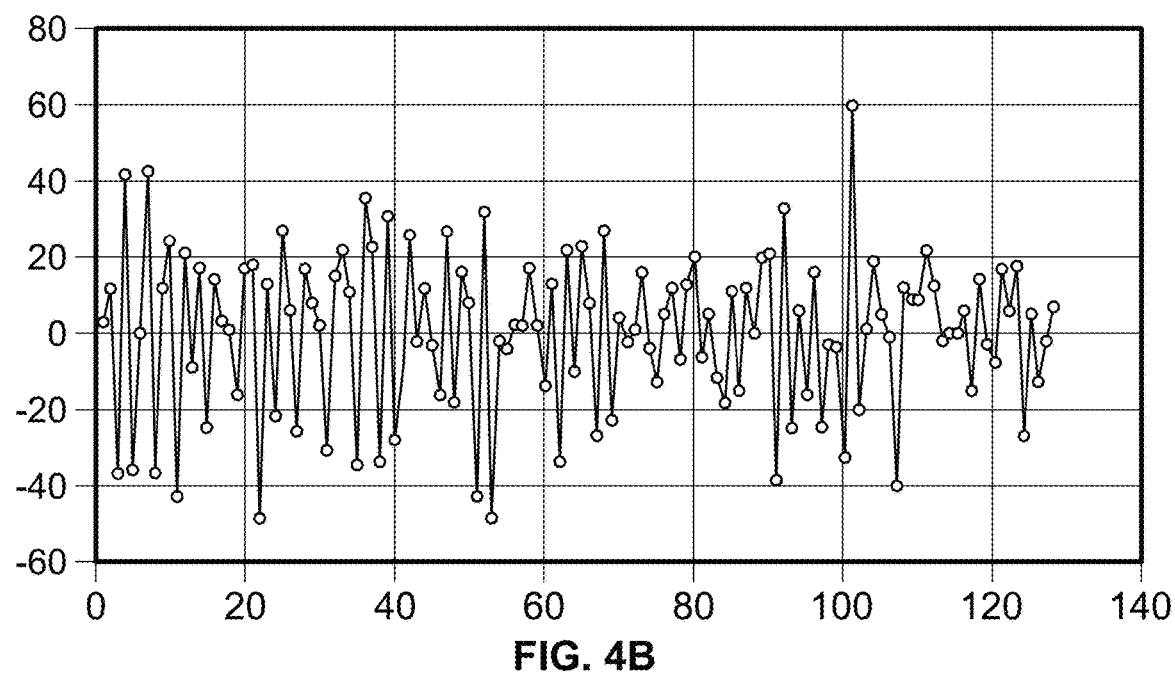

FIGS. 3A-B illustrate examples of barks (centered with zero-mean for visualization). At this sampling rate, each of the barks appear as smooth sine wave functions, and have very little noise. In contrast, sounds such as collar jingles have significant noise, and are relatively easy to detect. FIGS. 4A-B illustrate examples of these kinds of sounds. The waves are not smooth, and all over the place. For this reason, it is easier to detect these kind of non-barking sounds.

Figure 5A:
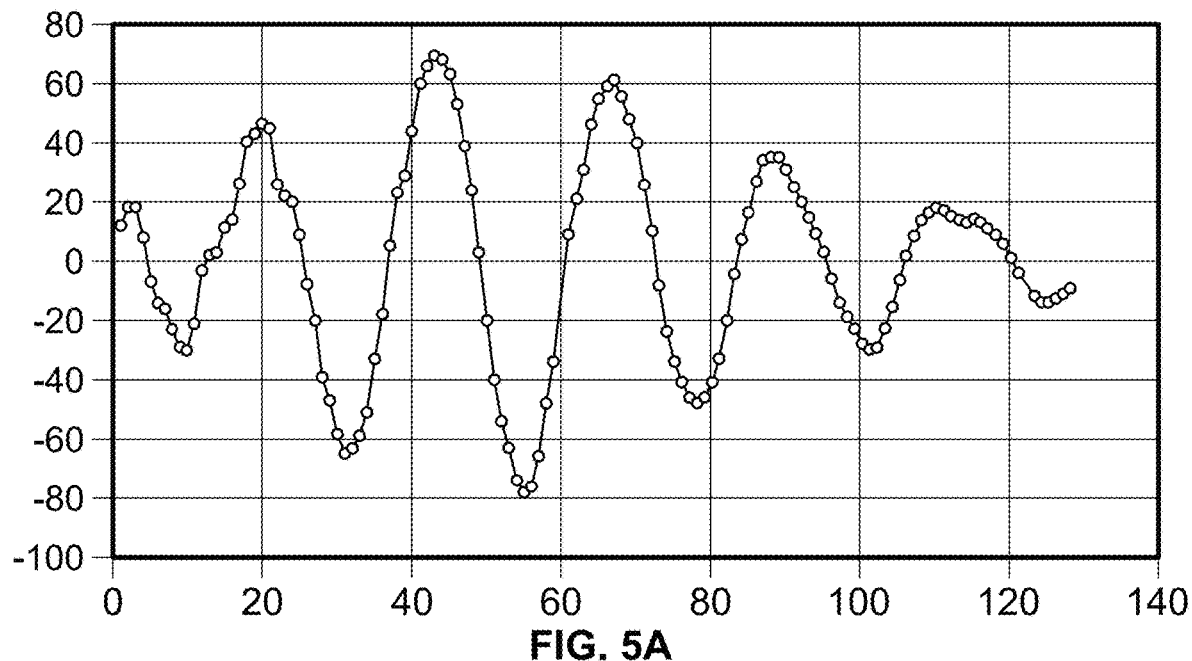
FIGS. 5A-B illustrate examples of audio waves associated with non-bark sounds that are difficult to differentiate with bark sounds.
Figure 5B:
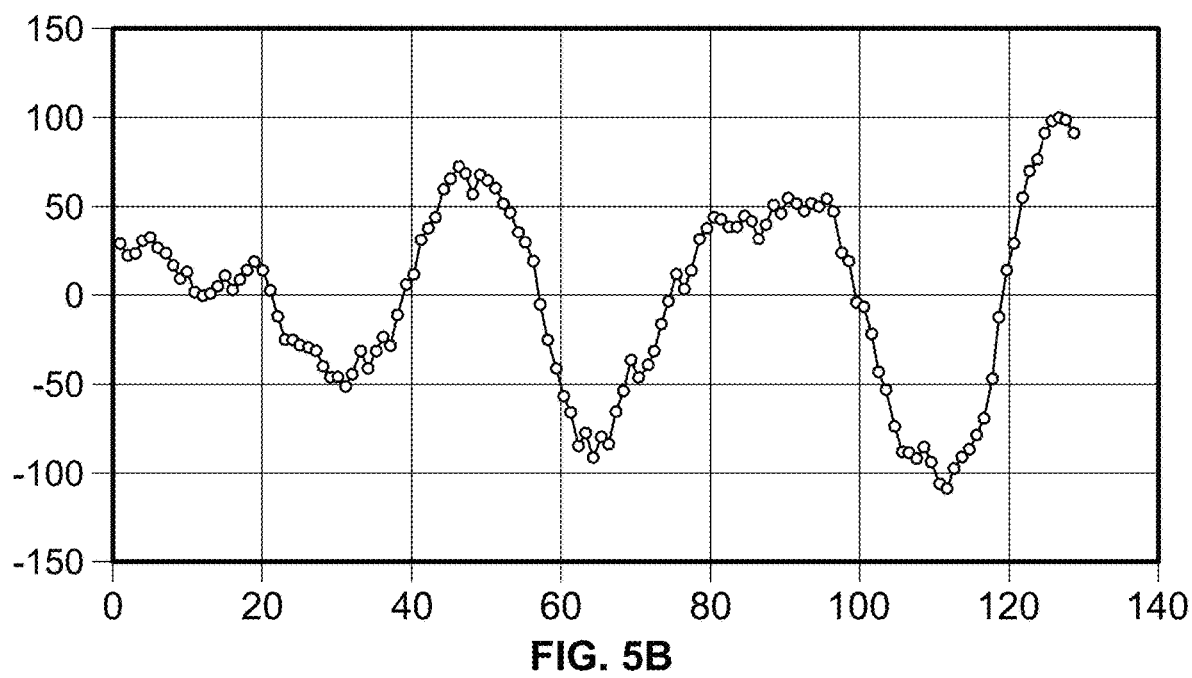

FIGS. 5A-B illustrate sound wave patterns that are difficult to classify, because from the figures one can see they have some similarities to those of FIGS. 3A-B, but included in these audio waves are small amounts of noise. Sounds like these can occur, for example, when the collar device contacts another object like a water bowl, the ground, or a collar buckle.

In order to differentiate between barks and non-barks, an algorithm has been developed to measure both the smoothness of the signal, as well as its magnitude. This is calculated by a 'scaled second derivative', defined as the maximum second derivative in the signal divided by its peak-to-peak amplitude. Barks are predicted when the second derivative of the signal is low, and the magnitude of the signal is high.

One of the areas of concern for determining and analyzing barks is the limited power supply often associated with the detection device. For example, in the world of dog collars, the collars are usually powered by a rechargeable battery, and thus have a finite amount of energy before the need to recharge the collar/battery.

Figure 6:
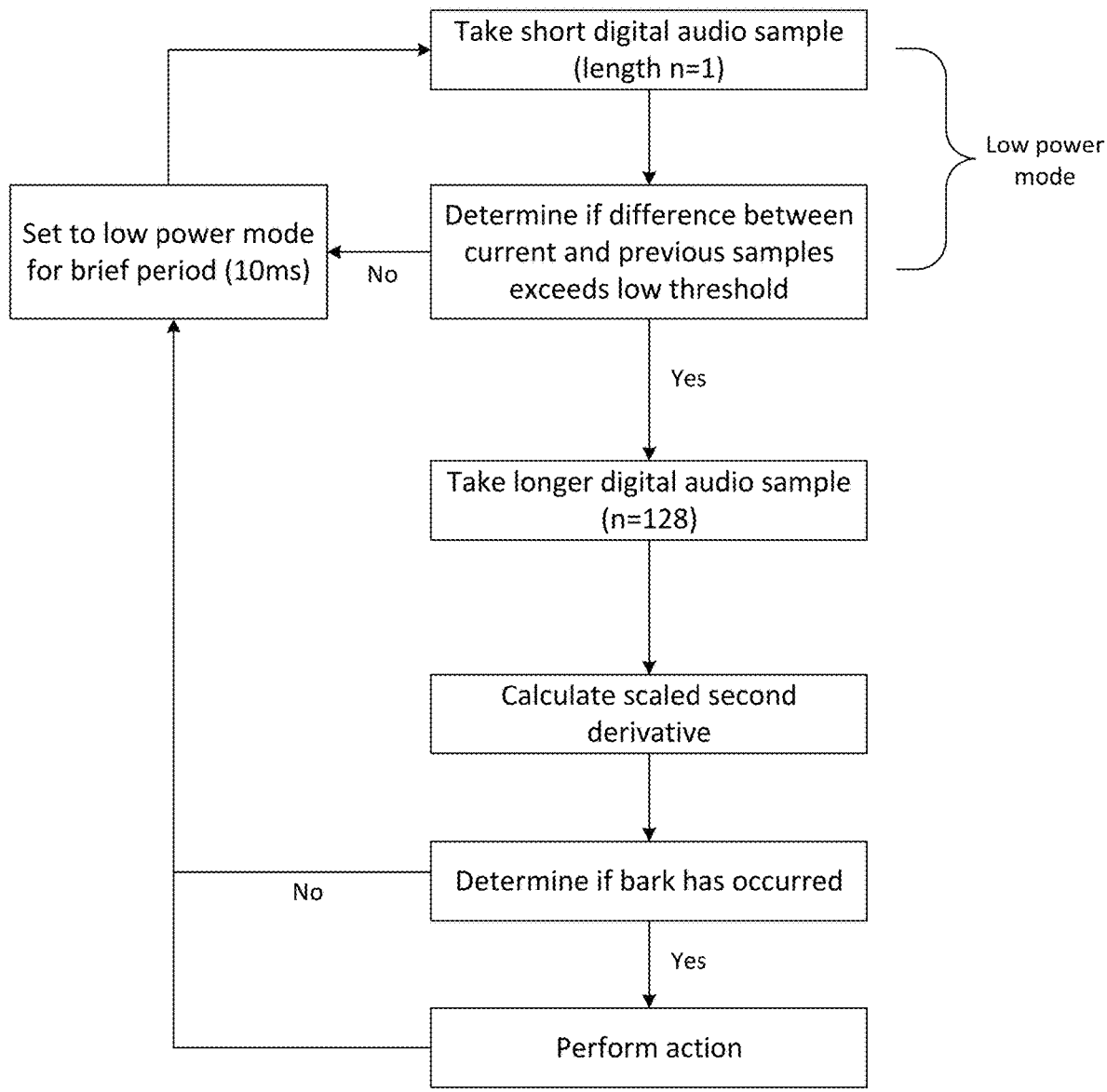
FIG. 6 illustrates a flowchart for operating a barking detection system in a low power mode.

In order to reduce power consumption, the algorithm can be implemented in a two-step approach that conserves power as shown by the flowchart in FIG. 6. Every 10 ms, a single audio sample of length n=1 is captured, and compared to the previous audio sample. If the absolute difference between those two samples exceeds a low threshold, then a longer audio sample of length n=128 (at ~30 kHz sampling rate) is captured. The scaled second derivative algorithm is then applied to the longer audio sample to determine if a bark has occurred. If an appropriate bark has been detected then a secondary action can take place, which can include turning on a camera positioned on the dog collar, providing a positive or negative reinforcement stimulus for training purposes, turning GPS on, and so forth.

Negative reinforcement stimulus or action can include one or more of shocking the dog, using the haptic feedback to buzz the dog, playing an audio signal, connecting to the user's cell phone to allow the user to reprimand the dog, or playing an audio recording of the user reprimanding the dog.

Figure 7:
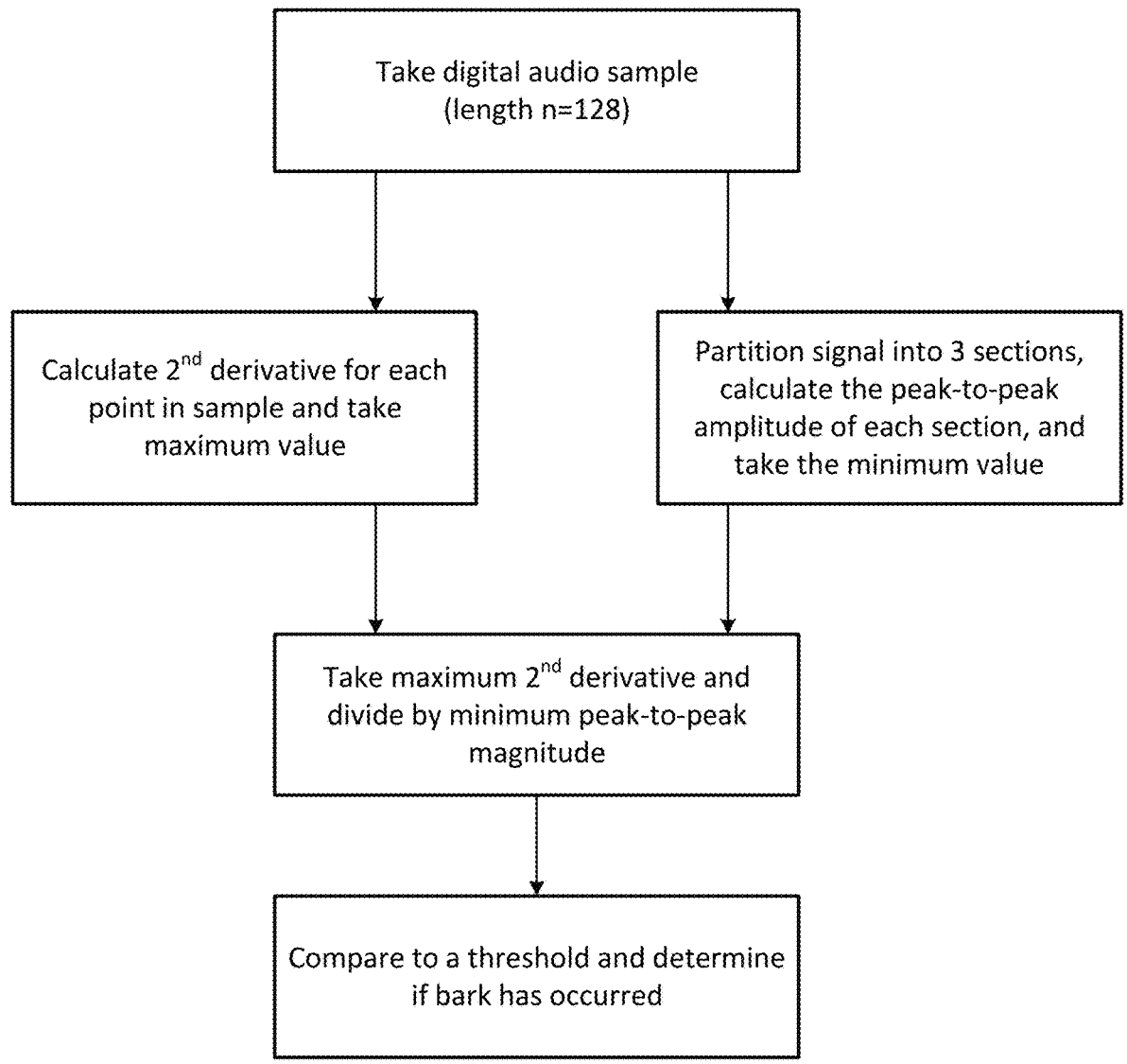
FIG. 7 illustrates a more detailed flowchart associated with a barking algorithm associated with the barking detection system herein, illustrating the second derivative function of the algorithm.
Figure 8:
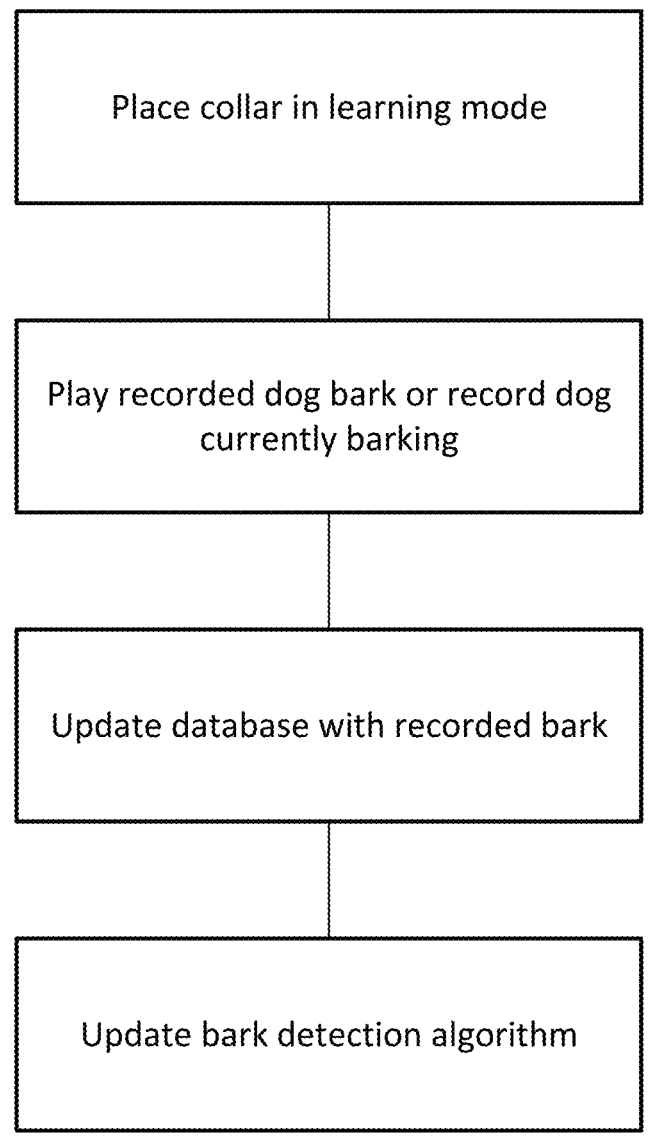
FIG. 8 illustrates flowchart for a learning mode of the bark detection system.

FIG. 7 illustrates a more detailed description and implementation of the bark detection algorithm using the scaled second derivative as described.

Note that when calculating the magnitude, the signal is partitioned into 3 equal segments, and the minimum peak-to-peak amplitude of those 3 segments is used. This helps reject certain types of false-positive signals where the beginning or end of the signal drops off.

The low power mode, which captures n=1 length audio samples, runs on a 10 ms loop. This interval can be adjusted, but should not be excessively long. Also, during the low power mode, the processor 214 is turned off, either fully or partially, and the secondary processor 232 analyzes the audio samples. Once the secondary processor 232 determines that the audio sample may be from a dog bark, the secondary processor 232 turns and the processor 214 that runs primary algorithm.

It should be noted the secondary processor 232 can be a separate and standalone processor or alternatively it can be built-in or integrated directly with the audio sensor. For the integrated version the secondary processor can be onboard logic to the audio sensor.

All data and code examples are based on a 10-bit ADC, i.e. integers from 0 to 1024. When implementing on new hardware, a 10-bit ADC is suggested, and it should be verified that the audio signals are well within the dynamic range and not saturating. Ideally, the range of the audio signals would be close to the sample data provided (by configuring the parameters of the ADC or potentially pre-processing the signals).

When implementing on new hardware, the sampling rate for capturing the n=128 length signals should be verified to be close to 30 kHz, i.e. within 20% or so.

There is one primary threshold for the algorithm, which is applied to the scaled second derivative. This threshold might need tuning for new hardware if the audio signals are significantly different. There is also an initial threshold for the low-power mode, which can be tuned if needed. The initial threshold is less critical than the primary threshold because the initial threshold is used only to determine if a detected noise may possibly have come from a dog bark. In other words, the initial threshold is used to determine that a detected noise is at least somewhat consistent with a dog bark while the primary threshold is used to confirm that noise is a dog bark.

In one embodiment, one or more primary thresholds are determined by calculating the second derivative on recorded samples of dogs barking. In one embodiment, this operation is performed on a variety of samples of dogs barking where an average of the calculated second derivatives of each bark is computed. The average is used to set the primary threshold value. An average can be computed on a subset of the dog barking sounds, and in particular dog barking sounds that are categorized by type and/or size of dog.

In an alternative embodiment, the audio samples of dog barking sounds each has a breed or type code associated therewith. A type code is more general than a breed and may include dog size (for example toy, small, medium, large, extra-large) or general categories (for example hound dogs, herders, hunting dogs, etc.). The user selects the breed or type code associated with the animal wearing the smart collar. The sample of the dog barking sound that matches the user selection is then used to calculate the primary threshold.

After a bark is detected, a short delay can be applied before attempting to detect another bark, otherwise a single bark may be detected multiple times. In one version of the algorithm, a delay of roughly half a second is used.

In an alternative embodiment, the second derivative can be compared with feedback from an accelerometer to also determine a barking motion and assist in ruling out harder to determine signals.

A historical database, of positively detected barks, can be updated periodically as barks are appropriately detected. This information can be further used to fine tune the algorithm to decipher between a dog bark associated with a particular dog associated with a particular dog collar. Thus, when the collar determines correctly that the sound is indeed a bark, it can then compare it to the historical record of dog barks associated with that particular dog to determine if it is the same animal. This helps when utilizing stimulus for training the dog, and ensuring that stimulus is not being applied when the bark is coming from another nearby source.

Figure 2:
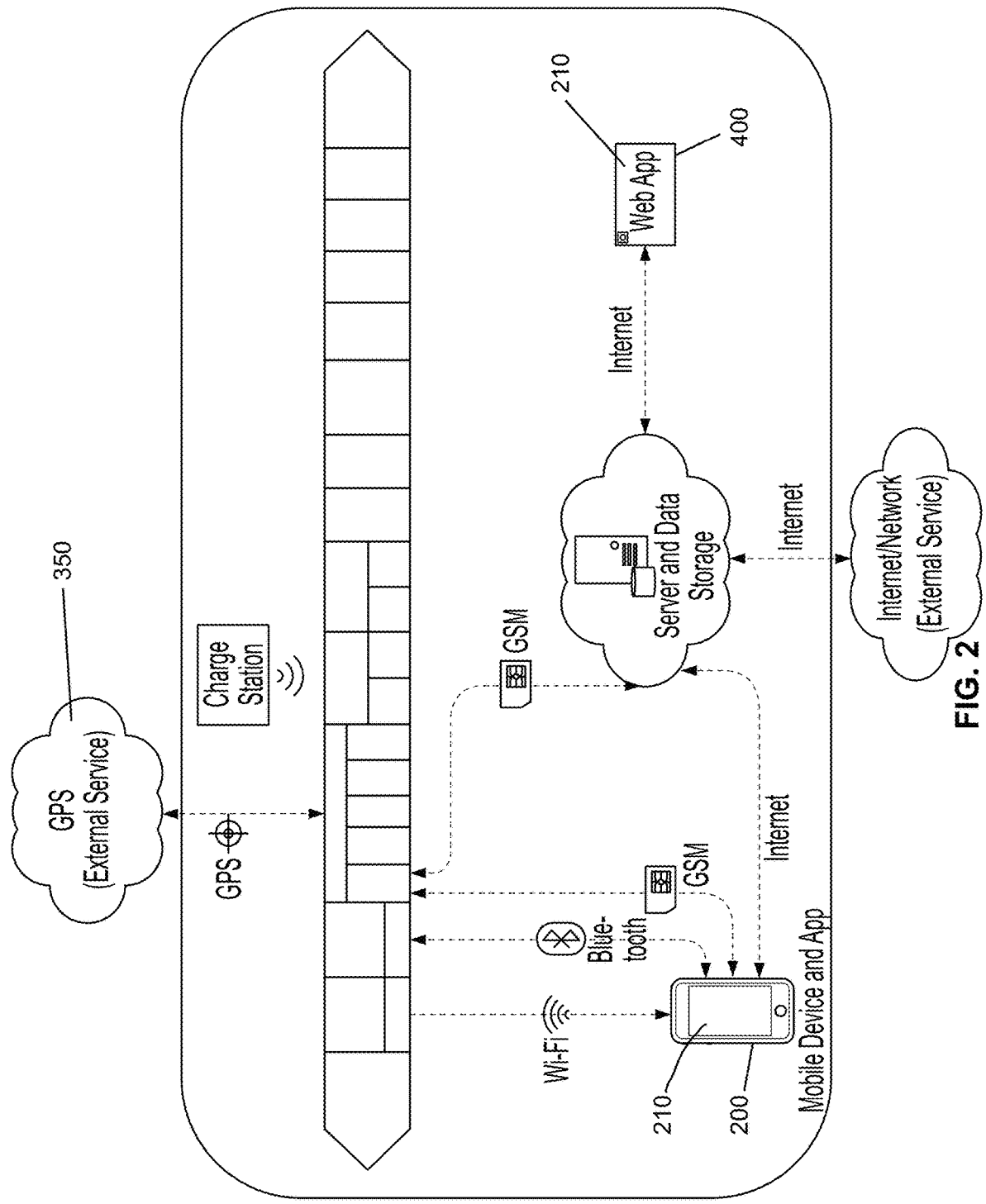
FIG. 2 illustrates an exemplary schematic of a location-based pet training system illustrative of various inventive concepts thereof.

Also contemplated herein is a pet training and location system which can be utilized by a pet owner to train a pet to behave in a certain manner depending on the pet's particular location as determined by a collar being worn by the pet. The bark detection algorithm and system can be incorporated onto a collar such as shown in FIGS. 1-2. In particular, the pet can be trained to bark during certain instances and not bark during others. The dog can be trained to stay in particular permitted areas and not enter restricted areas. In some instances, the restricted and permitted areas can be statically located, such as in a yard, which is a permitted zone, as opposed to outside the yard, in a garden plot, or a flower bed, which can be defined as restricted zones. Or alternatively the permitted areas can be mobile, such as a certain distance from a user, like when walking with the pet, wherein the pet is only allowed to travel a certain maximum distance from the user.

In some instances, particularly when beginning training, it can be advantageous to provide negative stimulation, or negative reinforcement to discourage a pet from leaving the permitted zone and entering one or more restricted zones. However, in some instances, once a restricted zone has already been entered it can be important to cease providing negative reinforcement, and instead provide a positive stimulus or reinforcement to encourage the pet to return to the permitted zone. Additionally, in some instances, use of negative stimulus can be omitted altogether, and positive reinforcement used as the sole mechanism for location-based training.

In accordance with these concepts, the system as contemplated can include a collar 100, as shown in FIGS. 1A-B, 2 which is configured to be affixed to a pet, the collar 100 can have a location determination mechanism 110 embedded therein which can provide a location of the pet. In some instances, the location determination mechanism can be a global positioning system (GPS) which can be utilized to provide a location of the pet within a certain degree of certainty using an external GPS location service 350. It will be appreciated that GPS is discussed herein in detail with the understanding that various location determination mechanisms can be utilized, including alternative sensors, triangulation methods, range finders, radio signals. Another particular example of setting up various permitted and restricted zones can include providing a wireless transmitter, such as a wi-fi transmitter, and wherein the permitted zone is defined as requiring the pet to stay within a distance of the transmitter to allow a particular signal strength, or maintain a wi-fi connection. The system can be provided with a user portal 210 or web app which can present an interactive map to the user. It will also be understood that the user portal 210 can be presented to the user or interacted with by the user via an application on a mobile device 200 or using an online web portal 400.

Also contemplated is an alternative embodiment wherein the collar can also be provided with additional sensors about the collar which can enable the collar to provide more information than merely location, but interaction information with various alternative objects as well. In some instances, the additional sensors can include microphones, radio frequency identification (RFID) transmitters and sensors 150, proximity, light, infrared, accelerometers, etc.

It will be appreciated that providing negative stimulus, such as through an electrode, and associated electric shock has been utilized in many previously known systems and is known as a relatively effective training method. However, one aspect of the present invention involves providing not only a negative stimulus for a negative behavior, but also allows for providing a positive stimulus for corrective behavior or desired behavior. In particular, one aspect of the present invention involves providing a positive stimulus when a pet stops barking after barking is detected. For example, when it is detected that a pet is barking and the pet is told, either by a person or person's voice recorded and stored in the collar, the pet receives positive stimulus. In order to provide positive stimulus, the system as contemplated can also include an audio transmitter, such as a speaker, which can be configured to provide an audio stimulus in the audible range or at ultrasonic frequencies which can be heard by the pet, but not the owner/user. In such cases, the audio transmitter can be configured to provide an audio signal which can be either pleasing or unpleasant to the pet in response to determined behaviors. The audio transmitter can provide positively trained sounds or recordings when positive activities are determined. For example, the user could record an audio recording of their voice offering praise to the pet, then the audio recording can be played to the pet when the pet comes back into the permitted zone from a restricted zone. Thus, secondary sensor can be utilized to generate the positive reinforcement mechanisms associated with system and collar. Whereas sensor is utilized to trigger or generate the negative reinforcement mechanisms associated with system and collar.

It will be understood that the audible signal can be configured to be any number of sounds, any of which can be trained to be a positive reinforcement sound for the pet. For example, with professional dog trainers the trainer can use a clicker which makes a particular noise, and give the dog a treat whenever they produce the sound with the clicker. Similar methods can be used in the present invention, and virtually any given sound with a predetermined or trained response from the pet can be utilized for this positive reinforcement. In some embodiments, such sounds can include chimes, or an ultrasonic version of any of the other sounds discussed above.

Further, it will also be understood that the audio transmitter can also be used for negative reinforcement, rather than using electric shock. In such cases the user can record a verbal reprimand, or some other negative reinforcement noise so as to provide a more humane negative reinforcement over the electric shock and electrode methodology.

In some embodiments, the user platform can include a dedicated screen in the application being devoted to hands-on training. As desired, the user can press a positive button to cause the collar to issue the positive reinforcement signal to help with real-time association of a particular sound with positive reinforcement. As such a separate button on the same screen can then cause the collar to issue the negative reinforcement signal(s) for real-time association of a particular sound with negative reinforcement.

With this interface, a trainer can perform general training with the collar's reinforcement signals instead of, or in addition to, traditional reinforcement signals.

It will also be understood that a power source, such as a battery, can be provided within collar which is configured to provide power to each of the aforementioned accessories, sensors, etc. The power source can be configured to be rechargeable either through a power port, or can incorporate wireless charging technology.

As discussed in some detail above, the system will include a user platform, such as an application, which can be configured to receive input from a user. It will be understood that the application/user platform can be accessed through mobile devices, web portals, or any number of suitable means. It will be understood that the platform is operable to define at least one permitted zone where the pet is permitted to reside and at least one restricted zone where the pet is restricted from entering. This can be achieved by defining or drawing boundaries, for example on a map.

Additionally, it will be understood that the collar can be provided with a local processing unit and non-transitory computer-readable media for tracking location or activities and saving data with regard to those activities locally. Such a local processor and non-transitory computer-readable media can store computer instructions wherein sounds, warnings, positive reinforcement, or negative reinforcement steps and when applied can each be determined locally and performed locally after transfer of such instructions from the user platform. Accordingly, the user platform can be connected to a remote server 300 having a remote processor and non-transitory computer-readable media can be utilized remotely, and instructions can then be transmitted to the collar to perform any such step or action using a mobile or home network.

In some embodiments, as desired by the user, the positive reinforcement signal or audible signal can sound intermittently for the entire time that the dog remains within the specified range from the user to aid in training purposes. In this manner, when the pet is behaving well, and staying within the prescribed distance, the pet will get continuous positive reinforcement. Alternatively, the system can be configured to only offer the positive reinforcement when re-entering the prescribed threshold distance from an out-of-range situation.

The system can also include processing capabilities and data storage capabilities which allow for activities to be determined, stored, and enter a desired mode based on a predetermined set of instructions in response to input or commands from the various sensor or commands provided through the communication systems. In some instances, pet data can be transmitted and stored over an external network or service for data tracking of various pet activities, parameters, etc.

In various aspects of the present invention the various sensors can be divided into various primary groups and subset groups. In response to various sensor inputs the collar can be prompted to enter into various modes wherein various primary and subset groups For example, the audio sensor or microphone in combination with an accelerometer can detect for example when a dog is barking, in response to a detected barking over a predetermined timeframe, in response the collar can then activate the optical sensor or camera so as to detect or otherwise capture an image or video of what the dog is barking at. It is thus contemplated herein that various sensors can be primary sensors and can cause the collar to enter various modes wherein various sensor subsets are activated or deactivated in response to sensor input. It will be appreciated that the collar system and application can have a predetermined mode set, and in some instances custom modes can be created or certain sensors can be manually controlled using the mobile application.

The mobile application, which can be specifically designed to connect to the collar using Bluetooth technology on a smart device, can allow for control of the collar itself in real-time. For example, an active mode or a user connected mode can allow the pet to leave a predetermined area without signaling alerts to a previously defined area perimeter.

In yet additional embodiments the collar system can be connected to a control system or program during a charging process or other hard connection means when not being worn by the pet. Such connection and charging means can be provided using USB or other serial connections and charging methods.

It will be appreciated that a speaker can be provided wherein the user/owner can give verbal commands, positive reinforcement or otherwise. In other embodiments, negative reinforcement mechanisms such as vibrators or shock electrodes can be provided so as to provide negative reinforcement for certain behaviors. Each of these functions can be automatically activated or alternatively manually activated via the mobile smart device of the owner/user using the control application.

In certain embodiments, the control application can be utilized to customize a collar response by registering each of the individual independent proximity sensors and saving a profile therefore which prompts specific stimuli based on the proximity thereto. For example, a sensor on a cat and a sensor on a dog can prompt a negative response to discourage the dog from chasing the cat.

In yet additional embodiments certain collar responses can be customized by a user using the control application, such as a custom recording including particular and customized praise(s)/reprimand(s) to be played back by the speaker based on a sensed proximity to a particular item or boundary.

In some embodiments, the collar has a learning mode that the user can activate. This is illustrated in FIG. 9. The learning mode is used to optimize the bark detection algorithm to enable the collar to differentiate barks from the dog wearing the collar from barks from other dogs. This is desirable in order to prevent the collar from providing negative feedback to a dog that is not barking while another nearby is barking.

In one embodiment, the user records the user's dog barking on a secondary device, such as a cell phone or another recording device. The user sets that collar to learning mode, either by utilizing a button or touchscreen on the collar, or via a processor wirelessly connected to the collar. The user plays the recorded dog bark and the recorded bark is used to update a database of dog barks. The algorithm is then updated to match waveforms to the user's dog bark.

In one embodiment, the user may indicate to the system that a detected bark was the user's dog bark or a bark from a different dog. This may be done by using an input on the collar or via wireless communication with a cell phone or other processing device.

In one embodiment, the system may have modes for different dog breeds. In this embodiment, a user may indicate the breed of the dog that is wearing the collar, and identify the breed of various barks detected by the collar. This information is used to update a database of waveforms that indicate a bark.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed:

1. A method of detecting a dog barking, the method comprising:
   taking a first digital audio sample for a first period of time;
   comparing the first digital audio sample to a previous digital audio sample to determine if a difference between the audio sample and the previous audio sample is below a predetermined initial threshold level;
   taking a second digital audio sample for a second period of time when the difference is above the predetermined initial threshold, wherein the second period of time is longer than the first period of time;
   calculating a scaled second derivative of the second digital audio sample;
   determining if a bark has occurred by comparing the scaled second derivative to at least one primary threshold value.

2. The method of claim 1, wherein the scaled second derivative is calculated by dividing a maximum second derivative of the second digital audio sample by the peak-to-peak amplitude of the second signal.

3. The method of claim 2, wherein the peak-to-peak amplitude is calculated by partitioning the second digital audio sample into three segments, calculating the peak-to-peak amplitude of each segment, and setting the minimum value as the peak-to-peak value.

4. The method of claim 3, wherein each of the three segments are equal.

5. The method of claim 1, further comprising:
returning or setting the low power mode for a period of time when the difference between either the first or second audio sample is equal to or below either the predetermined initial threshold or primary threshold.

6. The method of claim 1, wherein the at least one primary threshold is determined by calculating a scaled second derivative on one or more waveforms of known barks stored in a database.

7. The method of claim 6, wherein the at least one primary threshold is determined by a calculating an average of the calculated second derivatives of the stored waveforms of known barks.

8. The method of claim 6, wherein each stored waveform of known barks includes a breed or type indicator.

9. The method of claim 1, further comprising:
taking a digital audio sample for a first period of time periodically when the predetermined initial threshold has not been met.

10. The method of claim 9, wherein an audio sample is taken every 10 ms.

11. The method of claim 1, further comprising performing an action to deter barking when it is determined that a bark has occurred.

12. The method of claim 1, further comprising:
after determining that a hark has occurred, waiting a predetermined period of time; and
redetermining if a second bark has occurred after the predetermined period of time has expired.

13. A method of detecting a dog barking, the method comprising:
providing a dog collar having an audio sensor, a first processor, and a second processor;
operating the audio sensor for a first period of time to detect a first audio signal;
determining by the second processor that the audio signal is at least partially consistent with a sound of a dog barking;
operating the audio sensor for a second period of time to detect a second audio signal;
performing by the first processor an algorithm on a waveform of the second audio signal;
determining if the waveform is indicative of a dog bark; and
performing an action to deter barking when it is determined that a bark has occurred.

14. The method of claim 13, wherein the first period of time is shorter than the second period of time.

15. The method of claim 13, wherein the second processor is a low power processor that uses less electrical energy than the first processor.

16. The method of claim 13, further comprising setting a low power mode when a bark has not occurred, and wherein setting the low power mode includes turning off power to all or part of the first processor.

17. The method of claim 13, further comprising:
waiting a predetermined period of time and reperforming detecting an audio signal, performing an algorithm on the waveform, and determining if the waveform is indicative of a dog bark, when it is determined that a bark has occurred.

18. A system for detecting a dog barking, the system comprising:
a collar configured to be affixed to a pet, the collar further comprising:
a primary processor;
a power supply;
an audio sensor configured to detect audio signals; and
a secondary processor, wherein the secondary processor is a low power processor that uses less electrical power than the primary processor and is configured to determine if an initial detected audio signal may indicate that a dog is barking, and wherein the secondary processor is configured to activate the primary processor, based upon the initial detected audio signal, to determine if a second detected signal has a waveform that is consistent with a waveform from a sound of a dog barking.

19. The system for detecting a dog barking of claim 18, wherein the secondary processor is integrated with the audio sensor.

20. A system for detecting a dog barking, the system comprising:
a collar configured to be affixed to a pet, the collar further comprising:
a primary processor;
a power supply; and
an audio sensor having built-in logic, wherein the audio sensor is configured to detect initial samples of audio signals and wherein the built-in logic is configured to determine whether an initial sample meets an initial threshold, and
whereupon when the initial threshold is met, the primary processor is activated, and either the built-in logic or primary processor requests a secondary sample that is longer than the initial sample to determine whether the secondary sample is indicative of a dog barking sound.

21. The system of claim 20, further comprising a stimulus device configured to receive a signal from the primary processor, and wherein the stimulus device is activated if the secondary sample is indicative of a dog barking sound.

22. The system of claim 20, wherein the primary processor is de-activated if the secondary sample is not indicative of a dog barking sound.

23. The system for detecting a dog barking of claim 21, wherein the stimulus device includes any of the following: an electro-shocking device, a vibrating device, an audio emitting device, and a two-way communication system that includes sending and receiving audio between a user's smartphone to the collar.

* * * * *